July 1, 1930.  A. W. WEEDEN  1,769,047
ROTARY PUMP AND MOTOR
Filed June 21, 1928
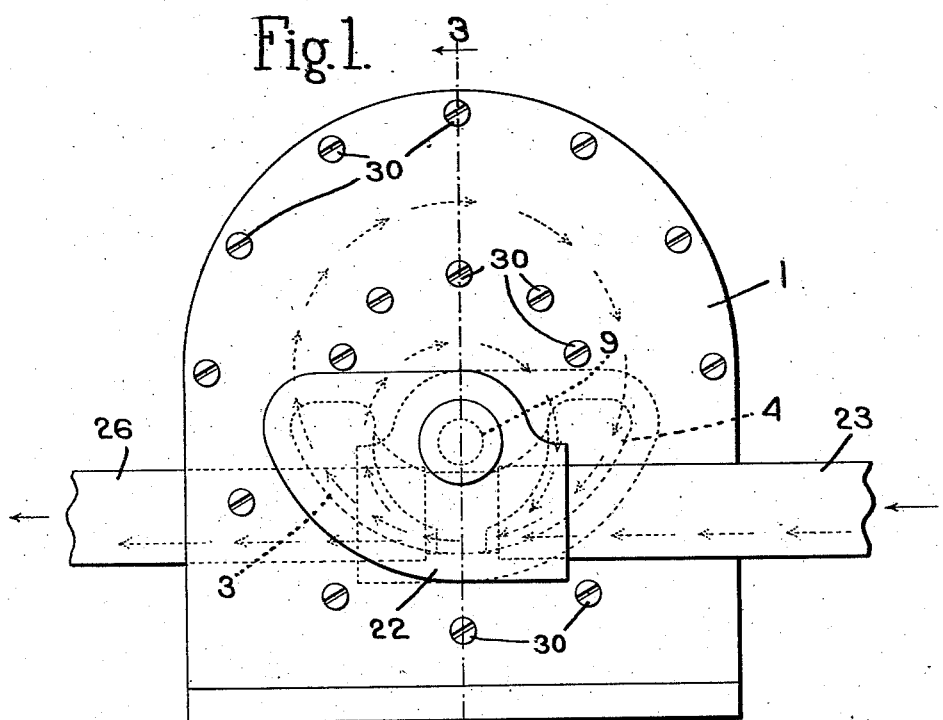
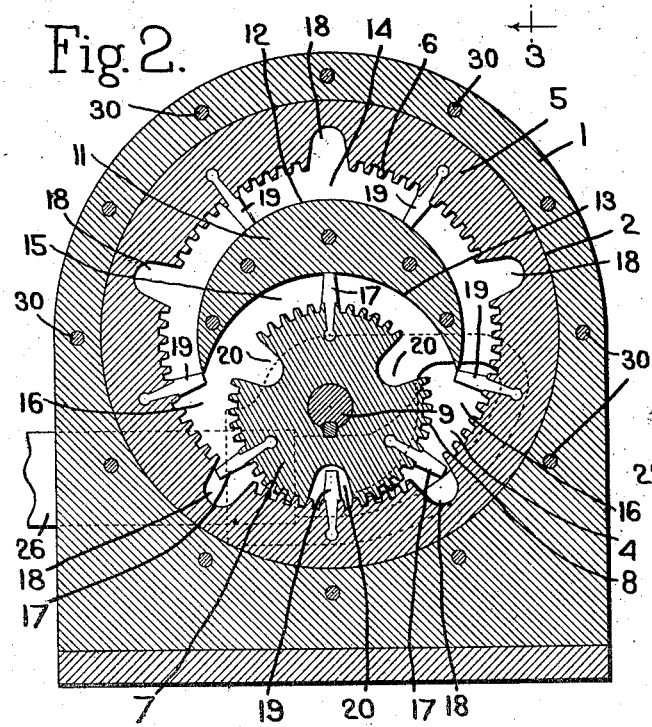
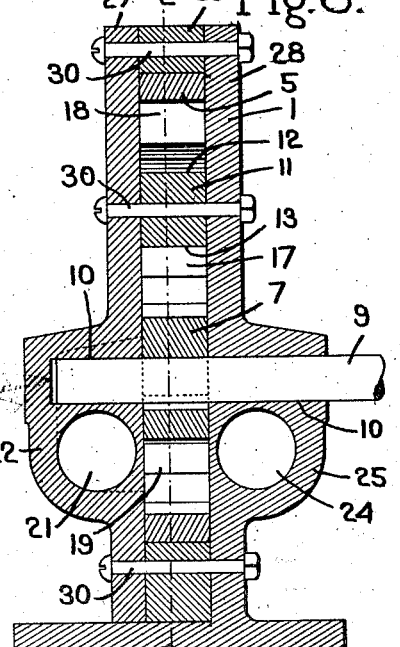
Inventor.
Arthur W. Weeden
by Heard Smith & Tennant
Attys.

Patented July 1, 1930

1,769,047

UNITED STATES PATENT OFFICE

ARTHUR W. WEEDEN, OF QUINCY, MASSACHUSETTS, ASSIGNOR TO EMFREE MANUFACTURING CO., OF WOLLASTON, MASSACHUSETTS, A CORPORATION OF MASSACHUSETTS

ROTARY PUMP AND MOTOR

Application filed June 21, 1928. Serial No. 287,328.

This invention relates to a rotary pump or motor and particularly to a rotary pump of the type comprising a stationary casing or housing and two co-operating rotary pumping elements therein, one of which is in the nature of an annular ring having internal gear teeth and the other of which is in the nature of a gear which meshes with the internal gear teeth and is mounted on a shaft, which will be the driving shaft in the case of a pump or the driven shaft in the case of a motor.

One of the objects of the invention is to provide an improved rotary pump of this type in which the fluid being pumped will have a continuous movement in the same direction while passing through the pump thus avoiding the friction loss which occurs where the fluid has to make abrupt changes of direction.

Other objects of the invention are to improve generally fluid pumps of this type all as will be more fully hereinafter set forth.

In order to give an understanding of the invention I have illustrated in the drawings a selected embodiment thereof which will now be described after which the novel features will be pointed out in the appended claims.

Fig. 1 is a side view of a pump embodying my invention;

Fig. 2 is a section on the line 2—2, Fig. 3;

Fig. 3 is a section on the line 3—3, Fig. 1.

The pump comprises a stationary casing 1 having a cylindrical chamber 2 in which the rotary pumping elements are received, said casing having an inlet port 3 leading thereinto on one side and an outlet port 4 leading therefrom on the other side.

The pumping elements comprise the cylindrical ring member 5 which fits within the chamber 2 and is provided with interior gear teeth 6 and a co-operating rotary member 7 having gear teeth 8 on its periphery which intermesh with the gear teeth 6 of the member 5. The rotary member 7 is fast on a shaft 9 that is journalled in bearings 10 formed in the casing 1. Said shaft constitutes the driving shaft if the device is operating as a pump and the driven pump if it is operating as a motor. This shaft 9 is situated eccentrically of the cylindrical chamber 2. The casing 1 is also formed with a crescent-shaped partition member 11 which is situated between the rotary members 5 and 7.

The convex face 12 of this crescent-shaped partition 11 is spaced from the inner toothed face of the ring 5 and the concave face 13 of said partition is spaced from the periphery of the rotary member 7. There will thus be a passageway or space 14 between the partition 11 and the rotary ring member 5 and another passageway or space 15 between said partition and the gear member 7. These two passageways merge together at the pointed ends of the partition as shown at 16.

The gear teeth 6 and 8 form the driving connection between the two rotary members 7 and 5. The gear 7 is provided with a plurality of long teeth or blades 17 which project considerably beyond the gear teeth 8, and the ring member 5 is provided with pockets 18 which are spaced so as to receive the blades 17 during the rotation of the rotary members. These blades 17 are of a proper length to engage the concave face 13 of the partition 11.

The ring member 5 is also provided with a plurality of inwardly-directed blades 19 which are of a length to engage the convex face 12 of the partition member 11, and the gear member 7 is formed with pockets 20 having the proper size and spacing to receive the blades 19 during the rotation of the rotary members.

The inlet port 3 opens into the pump chamber through one side thereof, said port communicating with a passage 21 formed in a boss 22 on the side of the casing 1, and said passage 21 communicating with an inlet pipe 23. This inlet opening 3 is located at the left side of the vertical diameter of the rotary members looking at Fig. 1.

The outlet or discharge port 4 is situated on the opposite side of the casing and also on the opposite side of the vertical diameter from the inlet port 3, said port 4 communicating with a passage 24 in a boss 25 formed on the side wall of the casing, said passage 24 having communication with a discharge pipe 26.

Assuming that the device is operating as a pump in which case power is applied to the shaft 9, the rotation of the shaft 9 will rotate the gear 7 and the latter will cause the ring member 5 to be rotated within the chamber 2. This ring member 5 is of proper diameter to fit the cylindrical casing 2 so that the walls of the casing form a guide for said ring member in its rotation.

The water which is supplied through the inlet port 3 will fill the space between the rotary members 5 and 7 at the left of the center and as the members continue their rotation the spaces between the blades 19 of the ring member 5 and the exterior face 12 of the crescent-shaped partition 11 will be filled with water, and the water which is thus trapped in each of these spaces will be carried around by the rotation of the ring member 5 to the right hand side of the casing looking at Fig. 2.

Similarly, the rotation of the gear member 7 produces pockets or spaces between the blades 17 and the concave face 13 of the crescent-shaped partition and the water thus trapped in these partitions will be carried from the left to the right hand side of the casing.

During the rotation of the members 7 and 5 these spaces or pockets are brought into communication with the outlet port 4 and as the gear teeth 6 and 8 are in close mesh at the bottom there is no chance for the water to pass between the two rotary members at this point and consequently the water will be delivered through the outlet port 4. If the contacting parts of the pump have a close fit the water will be delivered under a considerable pressure.

As illustrated in the drawings the water enters the pump from the right Fig. 1 as indicated by the arrows and it passes through the pipe 23 and passageway 21 and through the inlet port 3 and thence continues in the same general direction but in the form of a loop around through the passages 14 and 15 and is then delivered through the port 4 and continues its movement still in the same direction through the outlet pipe 26. There is, therefore, no abrupt change of direction of the water in passing through the pump and this is a decided advantage as it reduces friction loss and prevents the eddying of the water such as would be produced by abrupt changes in the direction of the flow.

The casing 1 may be made in various ways without departing from the invention. As herein illustrated it is formed with the two side plates 27, 28 between which are located a rim member 29 and also the crescent-shaped partition 11, these parts being bolted together by suitable bolts 30. Other ways, however, of producing the casing may be resorted to without in any way departing from the invention.

The blades 19 and 17 are preferably removably mounted in the rotary members 5 and 7 so that when any blade becomes worn it can be removed and replaced by a fresh blade. Each blade is of a shape and size to take the place of a single gear tooth and hence there will always be a sufficient number of teeth 6 and 8 in mesh to make a tight joint at the meshing point so as to prevent water from by-passing from the outlet to the discharge end of the pump. The gear teeth 6 and 8 constitute the sole driving means for transmitting motion from one rotary member to the other. The blades 17 have such a relation to the pockets 18 and the blades 19 such a relation to the pockets 20 that during the passing of any blade on one rotary member through a pocket on another rotary member the blade is out of contact with the walls of the pocket. The relation between the blades and pockets and gear teeth 6, 8, however, is such that there is always a driving connection between the two rotary members through the gear teeth. In other words, in all relative positions of the rotary members there will always be a sufficient number of gear teeth 6, 8 in mesh with each other to drive one rotary member from the other. The blades thus have no power-transmitting function but are merely to co-operate with the crescent-shaped member 11 to form the pockets in the separate passages 14 and 15.

The discharge port 4 is made wider at its upper end than at its lower end, said port conforming in shape substantially to the shape of the portion of the space between the two rotary members adjacent the point where the teeth mesh with each other.

By reason of the fact that the lower end of the port 4 extends clear to the meshing point of the teeth there will be no possibility that any water can be trapped between the teeth as they are being brought into mesh.

I claim:

1. In a rotary pump, the combination with a casing having a cylindrical chamber and a crescent-shaped partition extending across the chamber, of a ring member rotatable in said casing and encircling the crescent-shaped partition, said ring member having internal gear teeth which are spaced from the convex face of said partition, a second rotary member within said casing having external gear teeth meshing with those of the ring member, said second rotary member being situated below the partition member and spaced from the concave face thereof, a power shaft rigid with the second rotary member, said ring member having blades extending inwardly beyond the gear teeth and engaging the convex face of the partition member, and the second rotary member also having blades projecting beyond its gear teeth and engaging the concave face of the partition member, each rotary member having pockets in which the blades of the other member operate, said blades and pockets having such relation that each blade operates freely in the corresponding pocket without engaging the walls thereof, the gear teeth and pockets being so related that in all relative positions of the two rotary members there will be a sufficient number of gear teeth in mesh to constitute a driving connection between said members, said casing having an inlet port on one side and an outlet port on the opposite side, and there being two passages connecting the inlet port and the outlet port, one passing along the convex face of the crescent-shaped partition and the other along the concave face thereof.

2. In a rotary pump, the combination with a casing having a cylindrical chamber and a crecent-shaped partition extending across the chamber, of a ring member rotatable in said casing and encircling the crescent-shaped partition, said ring member having internal gear teeth which are spaced from the convex face of said partition, a second rotary member within said casing having external gear teeth meshing with those of the ring member, said second rotary member being situated below the partition member and spaced from the concave face thereof, a power shaft rigid with the second rotary member, said ring member having blades extending inwardly beyond the gear teeth and engaging the convex face of the partition member, and the second rotary member also having blades projecting beyond its gear teeth and engaging the concave face of the partition member, each rotary member having pockets in which the blades of the other member operate, said blades and pockets having such relation that each blade operates freely in the corresponding pocket without engaging the walls thereof, the gear teeth and pockets being so related that in all relative positions of the two rotary members there will be a sufficient number of gear teeth in mesh to constitute a driving connection between said members, said casing having an inlet port on one side with a passage leading thereto which crosses the vertical diameter of the casing and an outlet port on the other side which also crosses the vertical diameter of the casing, whereby the fluid passing through the pump takes a loop-shape course without any sharp changes of direction.

In testimony whereof, I have signed my name to this specification.

ARTHUR W. WEEDEN.